T. J. MAYALL.
Manufacture of Artificial Leather and Similar Fabrics.

No. 140,209.

Patented June 24, 1873.

Witnesses.
John Buckley
W. E. Chaffee

Inventor.
Thomas J. Mayall
by atty Pollok

UNITED STATES PATENT OFFICE.

THOMAS J. MAYALL, OF BOSTON, MASSACHUSETTS.

IMPROVEMENT IN THE MANUFACTURE OF ARTIFICIAL LEATHER AND SIMILAR FABRICS.

Specification forming part of Letters Patent No. 140,209, dated June 24, 1873; application filed June 16, 1873.

*To all whom it may concern:*

Be it known that I, THOMAS J. MAYALL, of Boston, Suffolk county, Massachusetts, have invented certain new and useful Improvements in Machinery for the Manufacture of Artificial Leather, of which the following is a specification:

The machinery in which my invention is comprised is designed to spread the pulped or prepared leather stock into sheets, and to condense, smooth, and dry, partly or wholly, the same. The machine is principally characterized by the employment of two endless aprons, between which the prepared stock passes, in combination with pounders arranged above the upper apron, to strike upon or pound the sheet of prepared pulp, the latter being protected from direct contact with the pounders by the intermediate upper apron, which prevents the pulp from spattering when struck, and serves to keep the sheet, to a great extent, smooth and even. The sheet, as it emerges from between these aprons, passes onto a second apron, traveling at the same rate of speed with the first, where it is heated and dried, and thence it is carried off to suitable frames where it is hung up to dry completely.

The nature of my invention, and the manner in which the same is or may be carried into effect, will be understood by reference to the accompanying drawing, in which—

Figure 1:
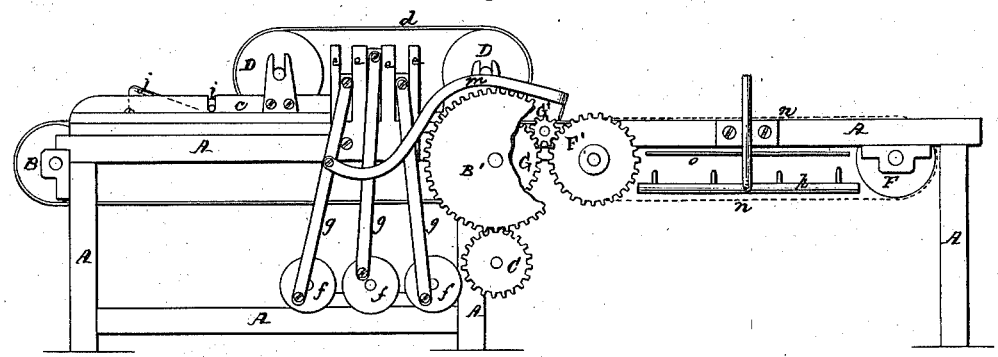
Figure 2:
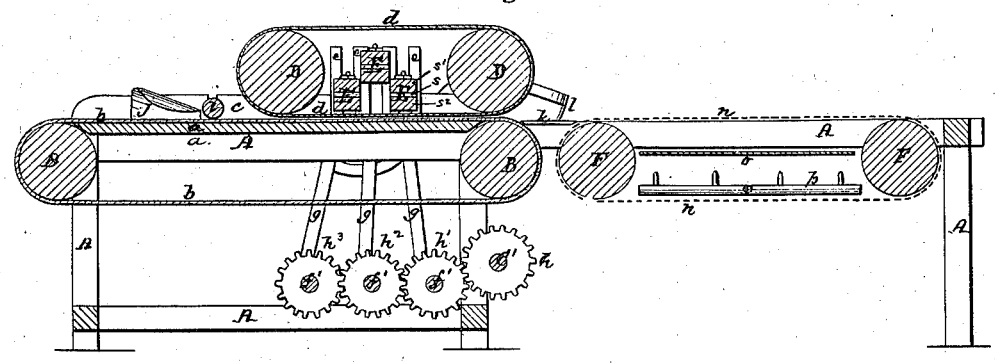
Figure 3:
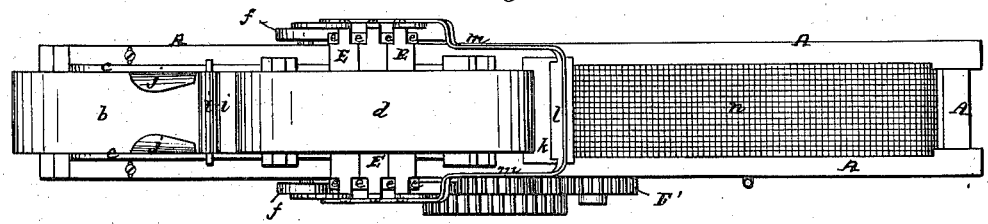

Figure 1 is a side elevation of a machine embodying my invention. Fig. 2 is a longitudinal vertical central section of the same. Fig. 3 is a top view of the same.

A is the frame which carries the various parts of the machine. It is provided with a bed, $a$, over and in contact with which passes the upper half of an endless apron, $b$, which may be termed the feed or conveying apron. This apron passes around rollers or drums B, one of which is provided with a large toothed wheel, B', meshing into a gear, C, on the driving-shaft C'. The bed $a$ is provided with upright side flanges $c$, for the purpose of preventing the prepared stock from spreading laterally. The apron $b$ runs between these flanges. The apron $b$ is made of vulcanized India-rubber compound, or of other suitable material for the purpose. The length of the bed $a$, and the distance between the drums B may vary. In practice, I find that it will suffice to place them from fifteen to eighteen feet apart, thus giving a bed of about this length. Above and in contact with the conveying-apron is a second apron, $d$, about half the length of the lower one, arranged substantially in the position indicated in the drawing. The journals of the two drums, D, around which this apron passes are supported in upright slotted standards, the drums being free to rise to accomodate themselves to varying thicknesses of the pulp-sheets. Between the two drums, D, of the upper apron are located pounders E, the ends of each of which are supported by vertical guides $e$, between which they can slide up and down. These pounders are arranged transversely to the length of the trough formed by the bed $a$ and flanges $c$, as shown in Fig. 3, and are designed to alternately or successively rise and fall, striking in their descent upon the pulped sheet which, held between the two aprons, $b$ $d$, is traveling slowly along beneath the pounders. Any suitable number of pounders can be employed. Three are shown in the drawing, but four, five, six, or more, can be used.

Any suitable mechanism, such as will readily suggest itself to any mechanic of ordinary skill, can be employed to impart the proper reciprocating movement to the pounders. One arrangement for the purpose is shown in the drawing, consisting of cranks $f$ on shafts $f'$, connected with their respective pounders by pitmen $g$, the shafts $f'$ deriving their movement from the main driving-shaft C' through gears $h$ $h^1$ $h^2$ $h^3$. The pounders should move much more rapidly than the apron $b$, and the gearing should be so regulated as to secure the result, so that every part of the pulp-sheet passing beneath may be sufficiently pounded to be condensed and brought to proper conditions. The pounders can, however, be operated by cams, or like trip-hammers, or in any other suitable way as above stated. The side pieces $d$ determine the width of the sheet, and the upper apron $d$, while it allows the pounders to act with full effect upon the pulp also prevents the latter from spattering. The pounders E are made with their lower faces adjustable and yielding, a section, $s$, of rubber or some other suitable spring device being interposed between the two parts, $s^1$ $s^2$, of the pounder. These two parts are held together by adjusting-screws, so arranged that the lower faces of the pounders may be adjusted up and down, as desired.

I prefer to set the faces of the pounders so that the lower face of the second shall be a little nearer the sheet than the first, and so on, in order that each pounder may compress and compact the pulp slightly more than is the case with the pounder preceding it. In front of the upper apron $d$ is a pressure-roll, $i$, journaled in slotted standards, and bearing upon the pulped mass entering the machine. The object of this roll is to smooth out the pulp into sheet form and prepare it to enter between the two aprons. In advance of the pressure-roll $i$ are guides $j$, shaped substantially as shown in the drawings, so as to flatten and spread out the pulp deposited on the apron at the front of the machine, the object being to thus fit the pulp to be more readily pressed out into shape by the pressure-roll $i$. The sheet of leather-board or prepared stock, as it emerges from between the two aprons, is received upon a suitable table or platform, $k$, over which travels back and forth a scraper or smoother, $l$, consisting of a bar rounded at its lower edge, a roller, or any other suitable device, to which a reciprocating movement back and forth over the platform $k$ is imparted by suitable means; in this instance, by arms $m$, jointed to one of the pitmen $g$ on each side of the machine. This smoother travels gently over the surface of the sheet, and smooths off the upper surface of the same.

To carry off, and at the same time to partly or wholly dry, the leather-sheet, I employ with the devices, such as above described, which form and condense the pulped sheet, a second endless apron, $n$, forming a prolongation of the bed of the machine, and of any suitable length. I usually place the drums F of this apron about thirty-eight or forty feet apart. It is driven by a gear, G, on the adjoining drum B, acting on a pinion, G', intermediate between the gear G and a gear, F', of equal size on the drum F. The apron $n$ is made of wire-gauze, and the upper part runs over or above a metallic plate or shield, $o$, beneath which gas-jets or other suitable heating devices, $p$, are arranged. The plate $o$ protects the leather-sheet from direct contact with the flame, and at the same time serves as a heater to dry the leather. The apron $n$, like the apron $b$, travels slowly, so that by the time the leather board or sheet reaches the further end of the same it is dry enough and of sufficient consistency to be freely taken from the machine and hung up on drying-frames, or otherwise suitably treated and finished.

Having now described my invention, and the manner in which the same is or may be carried into effect, what I claim and desire to secure by Letters Patent, is—

1. In machinery for the manufacture of artificial leather or other material to be formed into sheets from a pulped mass, the combination, with a conveying or feed apron running over a suitable bed, and a series of reciprocating pounders located above said apron, to act upon the sheet of pulp carried by the same, as set forth, of an upper apron arranged to run in contact with the upper surface of the pulp-sheet, and intermediate between said conveying apron and pounders, substantially as and for the purposes described.

2. In combination with the feed or conveying apron and upper apron intermediate between the same and the pounders, as set forth, the pressure roll or guides, or both, arranged in front of the upper apron and above the feed or conveying apron, to operate upon the pulp deposited upon the latter, before it enters between the two aprons, substantially as shown and described.

3. The combination with the feed or conveying apron and upper apron intermediate between the same and the pounders, of the smoother located in rear of said aprons, and arranged to reciprocate back and forth over a table or platform upon which the sheet of pulp passing from between the two aprons is delivered, substantially as shown and described.

4. In machinery for the manufacture of artificial leather, the combination, substantially as herein described, with the sheet forming and condensing devices, of an endless apron of wire-gauze, or its equivalent, for receiving the sheet as it passes from said devices, traveling at the same rate of speed as that at which the sheet is fed to it, and provided with means substantially such as shown and set forth, for heating and drying said sheet during its passage over the apron.

In testimony whereof I have hereunto signed my name in the presence two subscribing witnesses.

THOS. J. MAYALL.

Witnesses:
   EDM. F. BROWN,
   JOHN BULKLEY.